(12) United States Patent
Li et al.

(10) Patent No.: US 11,290,267 B2
(45) Date of Patent: *Mar. 29, 2022

(54) MULTI-PARTY SECURITY COMPUTING METHOD AND APPARATUS, AND ELECTRONIC DEVICE

(71) Applicant: ADVANCED NEW TECHNOLOGIES CO., LTD., Grand Cayman (KY)

(72) Inventors: Lichun Li, Hangzhou (CN); Shan Yin, Hangzhou (CN); Huazhong Wang, Hangzhou (CN); Wenzhen Lin, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,819

(22) Filed: May 26, 2021

(65) Prior Publication Data
US 2021/0281402 A1    Sep. 9, 2021

Related U.S. Application Data

(63) Continuation of application No. 17/086,385, filed on Oct. 31, 2020, now Pat. No. 11,050,561, which is a
(Continued)

(30) Foreign Application Priority Data

Aug. 14, 2018 (CN) .......................... 201810925182.1

(51) Int. Cl.
*H04L 29/06* (2006.01)
*H04L 9/08* (2006.01)

(52) U.S. Cl.
CPC .......... *H04L 9/0869* (2013.01); *H04L 9/0819* (2013.01); *H04L 2209/38* (2013.01); *H04L 2209/46* (2013.01)

(58) Field of Classification Search
CPC ............... H04L 9/0869; H04L 2209/38; H04L 2209/46
(Continued)

(56) References Cited

U.S. PATENT DOCUMENTS

| 7,372,856 B2 | 5/2008 | Garg et al. |
| 7,937,270 B2 | 5/2011 | Smaragdis et al. |

(Continued)

FOREIGN PATENT DOCUMENTS

| CN | 102611749 A | 7/2012 |
| CN | 103248478 A | 8/2013 |

(Continued)

OTHER PUBLICATIONS

First Search for Chinese Application No. 201810925182.1 dated Jan. 13, 2020.
(Continued)

*Primary Examiner* — Evans Desrosiers

(57) ABSTRACT

Embodiments of a secure multi-party computation method applicable to any computing node deployed in a distributed network are provided. A plurality of computing nodes is deployed in the distributed network. The plurality of computing nodes jointly participates in a secure multi-party computation based on private data respectively held by the computing nodes. The method includes: generating a computing parameter related to private data held by one computing node based on a secure multi-party computation algorithm; transmitting the computing parameter to other computing nodes participating in the secure multi-party computation for the other computing nodes to perform the
(Continued)

secure multi-party computation based on collected computing parameters transmitted by the computing nodes participating in the secure multi-party computation; and creating an audit log corresponding to the computing parameter, the audit log recording description information related to the computing parameter.

20 Claims, 2 Drawing Sheets

Related U.S. Application Data continuation of application No. PCT/CN2019/092217, filed on Jun. 21, 2019.

(58) Field of Classification Search
USPC .......................................................... 380/44
See application file for complete search history.

(56) References Cited

U.S. PATENT DOCUMENTS

| | | | |
|---|---|---|---|
| 8,732,461 | B2 | 5/2014 | Fujii et al. |
| 9,762,386 | B1* | 9/2017 | Nassaje ................ H04L 9/0894 |
| 9,785,369 | B1 | 10/2017 | Ateniese et al. |
| 10,382,205 | B1 | 8/2019 | Ko |
| 10,404,471 | B1 | 9/2019 | Griffin et al. |
| 10,805,393 | B2 | 10/2020 | Grefen et al. |
| 2002/0002076 | A1* | 1/2002 | Schneier ................ A63F 13/12 |
| | | | 463/29 |
| 2008/0021940 | A1* | 1/2008 | Suzuki ................... H04L 9/003 |
| | | | 708/200 |
| 2010/0121896 | A1 | 5/2010 | Oram |
| 2013/0275752 | A1 | 10/2013 | Zhang et al. |
| 2015/0222619 | A1 | 8/2015 | Hughes et al. |
| 2017/0250972 | A1* | 8/2017 | Ronda ................. H04L 9/3236 |
| 2017/0352027 | A1 | 12/2017 | Zhang et al. |
| 2018/0049043 | A1 | 2/2018 | Hoffberg |
| 2019/0028518 | A1 | 1/2019 | Fer et al. |
| 2019/0044703 | A1 | 2/2019 | Smith |
| 2019/0164153 | A1 | 5/2019 | Agrawal et al. |
| 2019/0165943 | A1 | 5/2019 | Chari et al. |
| 2019/0243572 | A1 | 8/2019 | Kursun |
| 2020/0007311 | A1 | 1/2020 | Oberhofer et al. |
| 2020/0034550 | A1 | 1/2020 | Kim et al. |
| 2020/0186528 | A1* | 6/2020 | Fan ........................... H04L 9/00 |
| 2020/0211105 | A1 | 7/2020 | Du |

FOREIGN PATENT DOCUMENTS

| | | |
|---|---|---|
| CN | 103888262 A | 6/2014 |
| CN | 104521178 A | 4/2015 |
| CN | 108364223 A | 8/2018 |
| CN | 109241016 A | 1/2019 |
| CN | 109255247 A | 1/2019 |
| CN | 109359470 A | 2/2019 |
| WO | 2016135738 A1 | 9/2016 |

OTHER PUBLICATIONS

First Office Action for Chinese Application No. 201810925182.1 dated Jan. 21, 2020.
Second Office Action for Chinese Application No. 201810925182.1 dated Mar. 17, 2020.
Third Office Action for Chinese Appli cation No. 201810925182.1 dated May 14, 2020.
Supplementary Search for Chinese Application No. 201810925182.1 dated Jul. 20, 2020.
Written opinion and International Search Report for PCT Application No. PCT/CN2019/092217 dated Sep. 19, 2019.
Search Report for European Application No. 19 850 323.7 dated Aug. 13, 2021.

* cited by examiner

MULTI-PARTY SECURITY COMPUTING METHOD AND APPARATUS, AND ELECTRONIC DEVICE

CROSS-REFERENCE TO RELATED APPLICATIONS

This application is a continuation application of U.S. patent application Ser. No. 17/086,385, filed on Oct. 31, 2020, which is a continuation application of International Patent Application No. PCT/CN2019/092217, filed on Jun. 21, 2019, which is based on and claims priority of the Chinese Patent Application No.: 201810925182.1, filed on Aug. 14, 2018. The above-referenced applications are incorporated herein by reference in their entirety.

TECHNICAL FIELD

One or more embodiments of this specification are related to the field of distributed computing, and in particular, to a secure multi-party computation method and apparatus, and an electronic device.

BACKGROUND

Secure multi-party computation is a cryptography technology. Multiple parties participating in a secure computation may, by executing a secure multi-party computation algorithm, jointly perform the secure computation based on private data respectively held by the parties to obtain a computation result without disclosing each party's private data to other parties.

Although the secure multi-party computation algorithm is designed to protect the privacy of each party's private data, an erroneous or malicious algorithm implementation may cause a breach on the private data. In an ideal scenario, the parties may each develop its own secure multi-party computation software and use it to participate in the secure multi-party computation. However, in actual applications, secure multi-party computation software used by the parties may usually be provided by the same provider, and therefore it is imperative for the provider to show that the secure multi-party computation software it provides is trustworthy and there is no risk of data breach.

SUMMARY

This specification provides a secure multi-party computation method, applicable to any computing node deployed in a distributed network, a plurality of computing nodes being deployed in the distributed network, the plurality of computing nodes jointly participating in a secure multi-party computation based on private data respectively held by the computing nodes.

The method may include: generating a computing parameter related to private data held by a computing node based on a secure multi-party computation algorithm; transmitting the computing parameter to other computing nodes participating in the secure multi-party computation for the other computing nodes to perform the secure multi-party computation based on collected computing parameters transmitted by the computing nodes participating in the secure multi-party computation; and creating an audit log corresponding to the computing parameter, the audit log recording description information related to the computing parameter.

Optionally, the method may further include: collecting computing parameters transmitted by the other computing nodes participating in the secure multi-party computation, and performing the secure multi-party computation based on the collected computing parameters transmitted by the other computing nodes; and creating an audit log corresponding to the computing parameters transmitted by the other computing nodes, and storing the audit log, the audit log recording description information related to the computing parameters.

Optionally, the computing parameter may include at least one of: a random number participating in the secure multi-party computation; and ciphertext data participating in the secure multi-party computation.

Optionally, the description information related to the computing parameter may include at least one of: a random number generation rule corresponding to the random number participating in the secure multi-party computation; and a key corresponding to the ciphertext data participating in the secure multi-party computation.

Optionally, the method may further include: performing, based on the audit log, a privacy audit on the computing parameter transmitted by the computing node participating in the secure multi-party computation, to determine whether the computing parameter transmitted by the computing node contains a risk of privacy leakage; or transmitting the audit log to a third-party audit node for the audit node to perform a privacy audit on the computing parameter transmitted by the computing node participating in the secure multi-party computation, to determine whether the computing parameter transmitted by the computing node contains a risk of privacy leakage.

Optionally, the performing, based on the audit log, a privacy audit on the computing parameter transmitted by the computing node participating in the secure multi-party computation, to determine whether the computing parameter transmitted by the computing node contains a risk of privacy leakage may include: verifying, based on the random number generation rule that is recorded in the audit log and corresponds to the random number transmitted by the computing node participating in the secure multi-party computation, whether the random number is a random number constructed based on the private data held by the other computing nodes; and if yes, determining that the computing parameter transmitted by the computing node contains the risk of privacy leakage; or if no, determining that the computing parameter transmitted by the computing node does not contain the risk of privacy leakage.

Optionally, the performing, based on the audit log, a privacy audit on the computing parameter transmitted by the computing node participating in the secure multi-party computation, to determine whether the computing parameter transmitted by the computing node contains a risk of privacy leakage may include: verifying, based on the key that is recorded in the audit log and corresponds to the ciphertext data transmitted by the computing node participating in the secure multi-party computation, whether the key is a known key held by the other computing nodes; and if yes, determining that the computing parameter transmitted by the computing node contains the risk of privacy leakage; or if no, determining that the computing parameter transmitted by the computing node does not contain the risk of privacy leakage.

This specification further provides a secure multi-party computation apparatus, applicable to any computing node deployed in a distributed network, a plurality of computing nodes being deployed in the distributed network, the plurality of computing nodes jointly participating in a secure multi-party computation based on private data respectively held by the computing nodes.

The apparatus may include: a generation module, configured to generate a computing parameter related to private data held by a computing node based on a secure multi-party computation algorithm; a transmission module, configured to transmit the computing parameter to other computing nodes participating in the secure multi-party computation for the other computing nodes to perform the secure multi-party computation based on collected computing parameters transmitted by the computing nodes participating in the secure multi-party computation; and a creation module, configured to create an audit log corresponding to the computing parameter, the audit log recording description information related to the computing parameter.

Optionally, the apparatus may further include: a collection module, configured to: collect computing parameters transmitted by the other computing nodes participating in the secure multi-party computation, and perform the secure multi-party computation based on the collected computing parameters transmitted by the other computing nodes.

The creation module may be further configured to: create an audit log corresponding to the computing parameters transmitted by the other computing nodes, and store the audit log, the audit log recording description information related to the computing parameters.

Optionally, the computing parameter may include at least one of: a random number participating in the secure multi-party computation; and ciphertext data participating in the secure multi-party computation.

Optionally, the description information related to the computing parameter may include at least one of: a random number generation rule corresponding to the random number participating in the secure multi-party computation; and a key corresponding to the ciphertext data participating in the secure multi-party computation.

Optionally, the apparatus may further include: an audit module, configured to: perform, based on the audit log, a privacy audit on the computing parameter transmitted by the computing node participating in the secure multi-party computation, to determine whether the computing parameter transmitted by the computing node contains a risk of privacy leakage; or transmit the audit log to a third-party audit node for the audit node to perform a privacy audit on the computing parameter transmitted by the computing node participating in the secure multi-party computation, to determine whether the computing parameter transmitted by the computing node contains a risk of privacy leakage.

Optionally, the audit module may be further configured to: verify, based on the random number generation rule that is recorded in the audit log and corresponds to the random number transmitted by the computing node participating in the secure multi-party computation, whether the random number is a random number constructed based on the private data held by the other computing nodes; and if yes, determine that the computing parameter transmitted by the computing node contains the risk of privacy leakage; or if no, determine that the computing parameter transmitted by the computing node does not contain the risk of privacy leakage.

Optionally, the audit module may be further configured to: verify, based on the key that is recorded in the audit log and corresponds to the ciphertext data transmitted by the computing node participating in the secure multi-party computation, whether the key is a known key held by the other computing nodes; and if yes, determine that the computing parameter transmitted by the computing node contains the risk of privacy leakage; or if no, determine that the computing parameter transmitted by the computing node does not contain the risk of privacy leakage.

This specification further provides an electronic device, applicable to a distributed network, a plurality of computing nodes being deployed in the distributed network, the plurality of computing nodes jointly participating in a secure multi-party computation based on private data respectively held by the computing nodes.

The electronic device may include: a processor; and a memory configured to store machine-executable instructions.

By reading and executing the machine-executable instructions that are stored in the memory and correspond to control logic of secure multi-party computation, the processor may be caused to: generate a computing parameter related to private data held by a computing node based on a secure multi-party computation algorithm; transmit the computing parameter to other computing nodes participating in the secure multi-party computation for the other computing nodes to perform the secure multi-party computation based on collected computing parameters transmitted by the computing nodes participating in the secure multi-party computation; and create an audit log corresponding to the computing parameter, the audit log recording description information related to the computing parameter.

This specification further provides a secure multi-party computation method, applicable to one computing node of a plurality of computing nodes deployed in a distributed network. The plurality of computing nodes may jointly participate in a secure multi-party computation based on data held on each of the plurality of computing nodes.

The method may include: generating, by the one computing node and based on a secure multi-party computation algorithm, a computing parameter related to the data held by the one computing node; transmitting, by the one computing node, the computing parameter to other computing nodes of the plurality of computing nodes participating in the secure multi-party computation for the other computing nodes to perform the secure multi-party computation based on computing parameters transmitted by the computing nodes participating in the secure multi-party computation; and creating, by the one computing node, an audit log corresponding to the computing parameter generated by the one computing node, the audit log recording description information related to the computing parameter.

In some embodiments, the aforementioned method may further include: collecting, by the one computing node, computing parameters transmitted by the other computing nodes participating in the secure multi-party computation, and performing the secure multi-party computation based on the collected computing parameters transmitted by the other computing nodes; and creating an audit log corresponding to the computing parameters transmitted by the other computing nodes and recording description information related to the computing parameters, and storing the audit log corresponding to the computing parameters transmitted by the other computing nodes.

In some embodiments, the computing parameter generated by the one computing node may comprise at least one of: a random number participating in the secure multi-party computation; and ciphertext data participating in the secure multi-party computation.

In some embodiments, the description information related to the computing parameter may comprise at least one of: a random number generation rule corresponding to the random number participating in the secure multi-party computation; and a key corresponding to the ciphertext data participating in the secure multi-party computation.

In some embodiments, the aforementioned method may further include: performing, based on the audit log corresponding to the computing parameter generated by the one computing node, a privacy audit on the computing parameter transmitted by the computing node participating in the secure multi-party computation, to determine whether the computing parameter transmitted by the computing node contains a risk of privacy leakage; or transmitting the audit log corresponding to the computing parameter generated by the one computing node to a third-party audit node for the audit node to perform a privacy audit on the computing parameter transmitted by the computing node participating in the secure multi-party computation, to determine whether the computing parameter transmitted by the computing node contains a risk of privacy leakage.

In some embodiments, the performing, based on the audit log corresponding to the computing parameter generated by the one computing node, a privacy audit on the computing parameter transmitted by the computing node participating in the secure multi-party computation, to determine whether the computing parameter transmitted by the computing node contains a risk of privacy leakage may include: determining, based on the random number generation rule recorded in the audit log and corresponding to the random number transmitted by the computing node participating in the secure multi-party computation, whether the random number is constructed based on the data held by the other computing nodes; and determining, in response to a determination that the random number is constructed based on the data held by the other computing nodes, that the computing parameter transmitted by the computing node contains the risk of privacy leakage; or determining, in response to a determination that the random number is not construed based on the data held by the other computing nodes, that the computing parameter transmitted by the computing node does not contain the risk of privacy leakage.

In some embodiments, the performing, based on the audit log corresponding to the computing parameter generated by the one computing node, a privacy audit on the computing parameter transmitted by the computing node participating in the secure multi-party computation, to determine whether the computing parameter transmitted by the computing node contains a risk of privacy leakage may include: determining, based on the key recorded in the audit log and corresponding to the ciphertext data transmitted by the computing node participating in the secure multi-party computation, whether the key is a known key held by the other computing nodes; and determining, in response to a determination that the key is a known key held by the other computing nodes, that the computing parameter transmitted by the computing node contains the risk of privacy leakage; or determining, in response to a determination that the key is not a known key held by the other computing nodes, that the computing parameter transmitted by the computing node does not contain the risk of privacy leakage.

In some embodiments, the distributed network may be a blockchain network, and the plurality of computing nodes may be nodes devices in the blockchain network.

This specification further provides a secure multi-party computation apparatus, comprising a processor and a non-transitory computer-readable memory coupled to the processor, and configured with instructions executable by the processor to perform any one of the aforementioned secure multi-party computation methods.

This specification further provides a non-transitory computer-readable storage medium having instructions stored thereon executable by a processor to cause the processor to perform any one of the aforementioned secure multi-party computation methods.

According to the foregoing technical solution, the computing nodes participating in the secure multi-party computation may, after generating computing parameters based on a carried secure multi-party computation algorithm, create and store an audit log corresponding to the computing parameters, and description information related to the computing parameters may be recorded in the audit log. Administrative users of the computing nodes may, by checking the audit log, access detailed information about the computing parameters generated based on the secure multi-party computation algorithm. Therefore, audit information facilitating the audit of the algorithm is easily accessible to a user of the secure multi-party computation algorithm, and thus, for a provider of the secure multi-party computation algorithm, the foregoing secure multi-party computation algorithm may be accessible and auditable without disclosing details (e.g., the source code) of the secure multi-party computation algorithm.

DETAIL DESCRIPTION OF THE EMBODIMENTS

Figure 1:
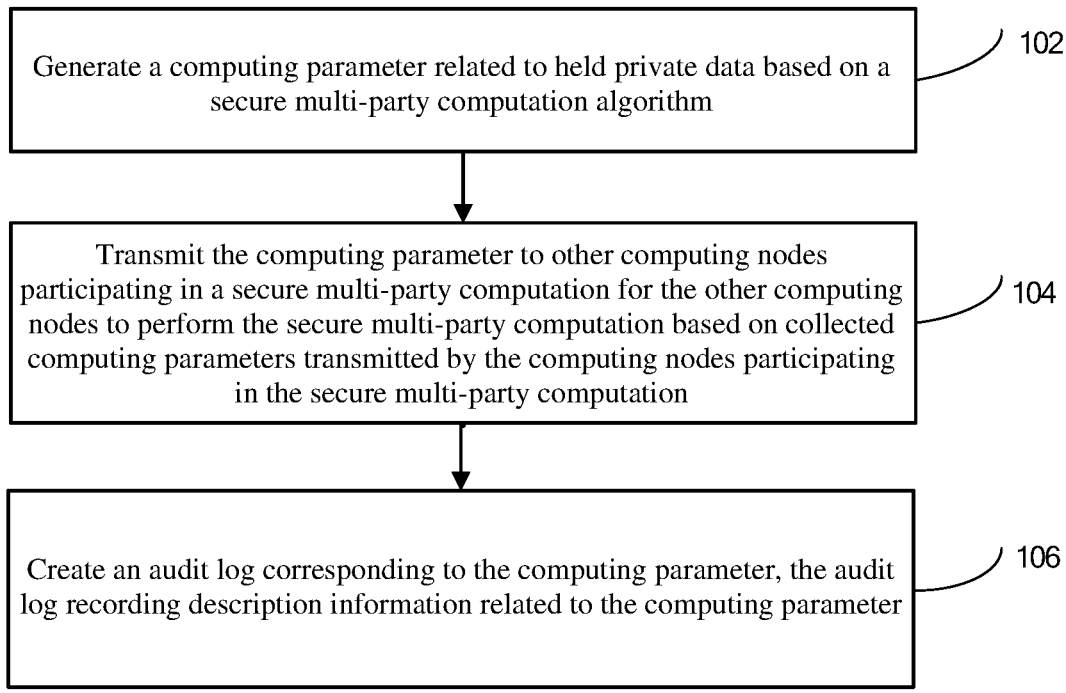
FIG. 1 is a flowchart of a secure multi-party computation method according to an embodiment.

In actual applications, for the purpose of privacy protection, secure multi-party computation algorithms are generally black box algorithms, and data transmission between computing nodes carrying a secure multi-party computation algorithm is nontransparent to outside.

For example, an exchange message carrying a large number of ciphertexts and/or random numbers may be generally transmitted between computing nodes carrying secure multi-party computation algorithms such as a secret sharing algorithm, a homomorphic encryption algorithm, and a garbled circuit algorithm. The specific contents of the ciphertexts and/or random numbers carried in the exchange message are hard to be decrypted even for a user of the secure multi-party computation algorithm.

Therefore, for a provider of a secure multi-party computation algorithm to show that the secure multi-party computation algorithm it provides is transparent and trustworthy, the provider may have to disclose the source code of the secure multi-party computation algorithm to users or a neutral body to complete an audit of the algorithm.

In view of the aforementioned limitations, this specification provides a technical solution in which the provider of the secure multi-party computation algorithm may provide to users of the algorithm audit information facilitating the audit of the algorithm without disclosing the source code of the algorithm.

In actual implementation, a computing node in a distributed network may generate computing parameters related to private data held by the computing node based on a carried secure multi-party computation algorithm. For example, in actual applications, the generated computing parameters may include a random number participating in the secure multi-party computation; and/or ciphertext data participating in the secure multi-party computation.

According to one aspect, after the computing parameter is generated, the computing node may transmit the generated computing parameter to other computing nodes participating in the secure multi-party computation in the distributed network for the other computing nodes to perform the secure multi-party computation based on collected computing parameters transmitted by the computing nodes participating in the secure multi-party computation.

According to another aspect, the computing node may further create an audit log corresponding to the computing parameter, with description information related to the computing parameter recorded in the audit log and store the created audit log.

For example, the generated computing parameter may include a random number participating in the secure multi-party computation and/or ciphertext data participating in the secure multi-party computation, and the description information related to the computing parameter may include a random number generation rule corresponding to the random number participating in the secure multi-party computation and/or key information corresponding to the ciphertext data participating in the secure multi-party computation.

According to the foregoing technical solution, the computing nodes participating in the secure multi-party computation may further create and store, after generating computing parameters based on a carried secure multi-party computation algorithm, an audit log corresponding to the computing parameters, and record description information related to the computing parameters in the audit log. Administrative users of the computing nodes may, by checking the audit log, access detailed information about the computing parameters generated based on the secure multi-party computation algorithm. Therefore, audit information facilitating the audit the algorithm may be accessible to a user of the secure multi-party computation algorithm, and thus, for a provider of the secure multi-party computation algorithm, the foregoing secure multi-party computation algorithm may be accessible and auditable without disclosing the source code of the secure multi-party computation algorithm.

This specification is described below with reference to specific embodiments and specific application scenarios.

FIG. 1 shows a secure multi-party computation method according to an embodiment of this specification. The secure multi-party computation method is applicable to any one computing node deployed in a distributed network. A plurality of computing nodes may be deployed in the distributed network. The plurality of computing nodes may jointly participate in a secure multi-party computation based on private data respectively held by each computing node. The secure multi-party computation method may include the following steps 102 through 106.

In step 102, a computing parameter related to private data held by one computing node may be generated based on a secure multi-party computation algorithm.

In step 104, the computing parameter may be transmitted to other computing nodes participating in a secure multi-party computation for the other computing nodes to perform the secure multi-party computation based on collected computing parameters transmitted by the computing nodes participating in the secure multi-party computation.

In step 106, an audit log corresponding to the computing parameter may be created. The audit log may record description information related to the computing parameter.

The distributed network may include a data network in any form that can support secure multi-party computation and may have a distributed architecture.

In one example, the distributed network may be a secure multi-party computation platform constructed by a device cluster (e.g., a server cluster) formed by a plurality of computing devices.

In another example, the distributed network may alternatively be a blockchain network formed by a plurality of node devices. That is, the computing nodes may be the node devices. An online service may be deployed in the blockchain network. The plurality of node devices may jointly participate in a secure multi-party computation based on private data held by the node devices, and it needs to be ensured that the private data held by each node device is not disclosed to other node devices. A specific type of the online service is not specifically limited in this specification.

The computing node may include a node device that can carry the secure multi-party computation algorithm in the distributed network. In some embodiments, the computing node may be a computer, a server, a smartphone, or any other suitable computing device. The specific form of a computing node is not limited in this specification.

The secure multi-party computation algorithm may include secure multi-party computation algorithms that are independently developed by the computing nodes or centrally provided by a provider. For example, in actual applications, the secure multi-party computation algorithm may, for example, correspond to secure multi-party computation software independently developed by the computing nodes or centrally provided by a provider.

The computing parameters may be, for example, computing parameters generated by the computing nodes participating in the secure multi-party computation based on the carried secure multi-party computation algorithms and related to the private data held by the computing nodes. The computing nodes may transmit generated computing parameters to each other through an exchange message and perform secure multi-party computation based on the collected computing parameters generated by the computing nodes.

In actual applications, the computing parameters may generally include random numbers needed to participate in a secure multi-party computation; and/or ciphertext data needed to participate in a secure multi-party computation.

It should be noted that, in actual applications, the foregoing secure multi-party computation algorithm may generally include secure multi-party computation algorithms such as a secret sharing algorithm, a homomorphic encryption algorithm, or a garbled circuit algorithm. Specific content included by the computing parameters may generally depend on specific algorithm types of the secure multi-party computation algorithms carried by the computing nodes. When the node devices carry the different algorithms listed above, the content included by the computing parameters may be different.

For example, based on the secret sharing algorithm, the computing parameter may generally include N random numbers obtained by splitting the private data held by the computing nodes. The N random numbers may include N−1 independently generated random numbers and an operation result (i.e., an Nth random number) obtained by performing an operation on the N−1 random numbers and the private data held by the computing nodes.

Based on the homomorphic encryption algorithm, the computing parameter may generally include ciphertext data obtained by encrypting the private data based on a key held by the computing node.

Based on the garbled circuit algorithm, the computing parameter may generally include random numbers (which may also be referred to as salt values of an input value and an output value) used for respectively replacing an input value (i.e., input data participating in computation) and an output value of a garbled circuit, and ciphertext data obtained by encrypting the salt value of output data by using the salt value of the input value as a key.

In this specification, a plurality of computing nodes may be deployed in a distributed network, as participants of the secure multi-party computation. The computing nodes may jointly carry the same type of secure multi-party computation algorithm to participate in a secure multi-party computation without disclosing the private data held by each computing node to other computing nodes.

For example, to participate in a secure multi-party computation, the computing nodes may jointly carry secure multi-party computation software provided by the provider of the secure multi-party computation algorithm and perform message exchange by using the secure multi-party computation software to transmit random numbers and/or ciphertext data participating in the secure multi-party computation between the computing nodes.

In addition to jointly carrying the same type of secure multi-party computation algorithm, an independent data source, a result storage system, and a log storage system may further be separately deployed in the computing nodes deployed in the distributed network.

The data source may be used for storing and maintaining private data held by data nodes or computing nodes.

The result storage system may be used for storing and maintaining a computation result eventually obtained by participating in a secure multi-party computation by the data nodes or computing nodes.

It should be noted that, in some secure multi-party computation in which only a small amount of data participates, it may be alternatively not necessary to deploy an independent data source and a result storage system in the node devices. In this case, the computing nodes may directly obtain data input by a user through an operation interface as the data source and output a final computation result of the secure multi-party computation to the user through the operation interface. The log storage system may be used for storing and maintaining audit logs that are created by the data nodes and related to the computing parameters.

It should be noted that, the created audit logs may be alternatively stored in a third-party storage device or storage system. In this case, it may not be necessary to deploy an independent log storage system locally in the computing nodes. That is, in actual applications, a generation node and a storage node of an audit log may be the same or different, and this is not specifically limited in this specification.

For any target computing node participating in the secure multi-party computation, when jointly completing the secure multi-party computation with other computing nodes, the target computing node may first read private data needed to participate in the secure multi-party computation from deployed data sources.

The target computing node may then perform computation on the received private data based on the carried secure multi-party computation algorithm to generate random numbers and/or ciphertext data related to the private data.

Further, the target computing node may construct an exchange message based on the carried secure multi-party computation algorithm and an existing message exchange mechanism to transmit the generated random numbers and/or ciphertext data as computing parameters to other computing nodes participating in the secure multi-party computation.

The other computing nodes may collect computing parameters transmitted, through the exchange messages, by the computing nodes participating in the secure multi-party computation, perform the secure multi-party computation based on the collected computing parameters, and store the computation result in the result storage system deployed locally.

Correspondingly, the target computing node may alternatively collect computing parameters transmitted, through the exchange messages, by the computing nodes participating in the secure multi-party computation, perform the secure multi-party computation based on the collected computing parameters, and store the computation result in the result storage system deployed locally.

It should be noted that a computation process in which the computing nodes participating in the secure multi-party computation perform the secure multi-party computation based on the collected computing parameters may depend on a specific algorithm type of the secure multi-party computation algorithm carried in the computing nodes. Generally, computation processes involved in different types of secure multi-party computation algorithms may be different.

A brief description of algorithm logic of various algorithms listed above is present below using examples in which the secure multi-party computation algorithms carried in the computing nodes are the secret sharing algorithm, the homomorphic encryption algorithm, and the garbled circuit algorithm, respectively.

1. Secret Sharing Algorithm

The secret sharing algorithm may also be referred to as a secret splitting algorithm. A basic principle of the secret sharing algorithm is to split a secret (e.g., a key) into a plurality of shares and deliver the shares to different people for storage. The secret can be restored only when the quantity of collected shares exceeds a threshold quantity. If the quantity of the collected shares is less than the threshold quantity, no information about the secret can be restored based on the shares. When the secret sharing algorithm is applied to secure multi-party computation, the threshold quantity is generally the same as a quantity of computing nodes needed to participate in the secure multi-party computation and be deployed in a distributed network.

When the secret sharing algorithm is applied to the secure multi-party computation, the computing nodes may respectively split input data into shares and exchange the shares with each other. The computing nodes then may respectively perform an operation on locally collected shares to obtain an aggregated share corresponding to a final computation result of the secure multi-party computation (i.e., one share of the final computation result). Eventually, the computing nodes may merge all aggregated shares corresponding to the final computation result to obtain the final computation result, hereby completing the secure multi-party computation.

If the secure multi-party computation algorithm carried in the computing nodes deployed in the distributed network is the secret sharing algorithm, after the target computing node reads private data S that is needed to participate in the secure multi-party computation from a deployed data source, the target computing node may first split the private data into d shares (i.e., random numbers) according to the secret sharing algorithm.

For example, based on the secret sharing algorithm, d−1 independent random numbers may be generated in a preset random number value space P in a random extraction manner as the first d−1 shares, and the shares are recorded as $S_1$, $S_2$, $S_3$, $S_{d-1}$.

For example, if the private data S is integer data of 64 bits, $P=2^{64}$; and the d−1 independent random numbers generated may all be values extracted from a value space of $[0, 2^{64}1]$.

Further, an operation may be performed on the first d−1 random numbers and the private data S together, and an operation result obtained through the operation may be used as a d-th share, which may be recorded as $S_d$.

An operation rule for performing an operation on the d−1 random numbers and the private data S together generally may depend on a specific secret sharing algorithm.

For example, the most common trivial additive secret sharing algorithm in the secret sharing algorithm may be used as an example, and d shares obtained by splitting the private data may be required to meet the following expression:

$$S=S_1+S_2+S_3+\ldots +S_d \% P,$$

where % is the modulus operator.

Based on the foregoing expression, $S_d=S-(S_1+S_2+S_3+\ldots +S_{d-1})\% P$, in this algorithm, $S_d$ may be obtained by subtracting a modulus computation result of a sum of the first d−1 shares and the value space P from the private data S.

After data splitting for the private data S is completed based on the secret sharing algorithm, the target computing node may reserve one share locally, construct an exchange message based on an existing message exchange mechanism, and transmit the remaining shares to other computing nodes participating in the secure multi-party computation respectively.

The target computing node may reserve the Nth share locally or may reserve any one of the first d−1 shares. That is, when the target computing node reserves the Nth share locally, only the random numbers used as the first d−1 shares may be used as the computing parameters. When the target computing node reserves any one of the first d−1 shares locally, the remaining random numbers used as the first d−1 shares and an operation result of the N−1 random numbers and the private data S may be used as the computing parameters.

According to one aspect, other computing nodes may collect shares transmitted by the computing nodes, perform computation on the collected shares according to operation logic stipulated by the computing nodes to obtain a share corresponding to the final computation result, and transmit the computation result to the other computing nodes for broadcasting. The target computing node may collect the computation results broadcast by the other computing nodes, perform computation on the collected computation results again according to the stipulated operation logic to obtain a final computation result obtained by performing secure multi-party computation on the private data held by the computing nodes, and then store the final computation result in the result storage system deployed locally.

According to another aspect, the target computing node may alternatively collect the shares transmitted by the other computing nodes, perform computation on the collected shares according to the stipulated operation logic to obtain a share corresponding to the final computation result, and transmit the computation result to the other computing nodes for broadcasting. The other computing nodes may collect the computation results broadcast by the computing nodes, and perform computation on the collected computation results again according to the stipulated operation logic to obtain a final result obtained by performing secure multi-party computation on the private data S held by the other computing nodes.

The operation logic stipulated by the computing nodes may depend on an actual secure multi-party computation requirement, and this is not specifically limited in this specification.

2. Homomorphic Encryption Algorithm

The homomorphic encryption algorithm is a type of encryption algorithm that can perform data operation in a ciphertext state. A ciphertext of the computation result obtained by performing computation based on a cleartext may also be obtained by performing computation on the ciphertext without decryption and the use of a decryption key.

For example, an operation may be performed on a homomorphic ciphertext E(a) of a and a homomorphic ciphertext E(b) of b to obtain a ciphertext E(a+b) of a+b, a, b or a+b will not be disclosed in the operation process, and a decryption key does not need to be used for decrypting the ciphertext.

If the secure multi-party computation algorithm carried in the computing nodes deployed in the distributed network is the homomorphic encryption algorithm, after the target computing node reads private data S, which is needed to participate in the secure multi-party computation from a deployed data source, the target computing node may first generate a pair of encryption key PK and decryption key SK for homomorphic encryption according to the homomorphic encryption algorithm, encrypt the private data based on the generated encryption key PK to generate ciphertext data, construct an exchange message based on the homomorphic encryption algorithm and an existing message exchange mechanism, and respectively transmit the generated ciphertext data to other computing nodes participating in the secure multi-party computation.

According to one aspect, the other computing nodes may also use the same mode described above to generate a pair of encryption key PK and decryption key SK for homomorphic encryption according to the homomorphic encryption algorithm. The other computing nodes may encrypt private data read from a locally deployed data source based on the encryption key PK to obtain ciphertext data, collect ciphertext data transmitted by the computing nodes and obtained by encrypting the private data respectively held by the computing nodes, and perform computation on collected ciphertext data transmitted by the other computing nodes and the ciphertext data generated locally together according to stipulated operation logic, to obtain ciphertext data corresponding to a final computation result obtained by performing secure multi-party computation on the private data held by the computing nodes (the ciphertext data cannot be decrypted locally by the other computing nodes).

After the ciphertext data corresponding to the final computation result is obtained, the other computing nodes may broadcast the ciphertext data corresponding to the final computation result to node devices. After the target computing node receives the ciphertext data corresponding to the final computation result, the target computing node may decrypt the received ciphertext data corresponding to the final computation result based on the decryption key SK, to obtain cleartext data of the final computation result, and then store the cleartext data of the final computation result in the result storage system deployed locally.

According to another aspect, the target computing node may alternatively collect the ciphertext data transmitted by the other computing nodes and obtained by encrypting the private data respectively held by the other computing nodes, and perform computation on the collected ciphertext data transmitted by the other computing nodes and the ciphertext data generated locally together according to the stipulated operation logic, to obtain ciphertext data corresponding to the final computation result obtained by performing secure multi-party computation on the private data held by the computing nodes (the ciphertext data cannot be decrypted locally by the target computing node).

After the ciphertext data corresponding to the final computation result is obtained, the target computing node may broadcast the ciphertext data corresponding to the final computation result to the other computing nodes. After the other computing nodes receive the ciphertext data corresponding to the final computation result, the other computing nodes may decrypt the received ciphertext data corresponding to the final computation result based on the decryption key SK, to obtain cleartext data of the final computation result, and then store the cleartext data of the final computation result in the result storage system deployed locally.

It should be noted that, the operation logic stipulated by the computing nodes may still depend on an actual secure multi-party computation requirement, and this is not specifically limited in this specification. However, any operation logic may be decomposed into basic operations such as additive homomorphic encryption and multiplicative homomorphic encryption based on the homomorphic encryption algorithm.

3. Garbled Circuit Algorithm

A principle of the garbled circuit algorithm is to simulate an application-specific integrated circuit (ASIC) by using a computer to implement secure multi-party computation. Any secure multi-party computation task may be implemented by the ASIC designed for the task. That is, a gate circuit corresponding to the operation logic may be simulated by connecting a plurality of operation gates (e.g., basic operation gates such as AND gates, and XOR gates) according to the operation logic corresponding to the secure multi-party computation task, and an operation then may be performed by using the gate circuit.

Based on the garbled circuit algorithm, the operation logic corresponding to the secure multi-party computation task may be represented as a gate circuit, each operation path of the gate circuit may then be encrypted, and the encrypted gate circuit may be referred to as the garbled circuit. Secure multi-party computation may be implemented by performing an operation of the garbled circuit by using a computer.

When secure multi-party computation is implemented based on the garbled circuit algorithm, computing nodes participating in the secure multi-party computation may be classified into two roles, namely, a generation party of the garbled circuit and an execution party of the garbled circuit.

For example, in one secure multi-party computation in which K computing nodes participate, K−1 computing nodes may be used as the generation party of a circuit to generate a garbled circuit, and one remaining computing node may be used as the execution party of the garbled circuit to perform an operation on the garbled circuit, to obtain a final computation result.

If the secure multi-party computation algorithm carried in the computing nodes deployed in the distributed network is the garbled circuit algorithm, the operation logic corresponding to the secure multi-party computation task may first be represented as a gate circuit.

The operation logic requires that the plurality of computing nodes to jointly participate based on the private data respectively held by the computing nodes. One computing node may only correspond to one or more operation gates in the gate circuit, and the private data held by the computing node may only be used as input data of one or more operation gates in the gate circuit.

Further, after the target computing node reads the private data S that is needed to participate in the secure multi-party computation from a deployed data source, the target computing node may use the received private data S as an input value of a corresponding operation gate in the gate circuit to perform an operation in the operation gate, to obtain an output value of the operation gate.

In actual applications, the operation logic of each operation gate in the gate circuit may be represented and performed by using a truth table. One truth table may be used for recording an output value obtained by an output path when any value is input into an input path of the operation gate. Each row in the truth table may correspond to one input value combination of the input path. To hide true values of the operation paths in the operation gate in the operation of the gate circuit, according to one aspect, the target computing node may, based on a random function carried in the garbled circuit algorithm, generate random numbers to replace the input values and the output values in the truth table of the operation gate. The random numbers obtained after the replacement may be referred to as salt values.

According to another aspect, the target computing node may alternatively use the salt values corresponding to the input values of the operation gate as a key, to encrypt the salt values of the output values in the truth table of the operation gate to obtain ciphertext data. The target computing node may replace the salt values of the output values in the original truth table based on the ciphertext data to obtain a garbled truth table. Alternatively, the target computing node may independently create a garbled truth table based on the ciphertext data (i.e., the garbled truth table only includes the ciphertext data).

According to a third aspect, the target computing node may alternatively shuffle a sequence of each row in the garbled truth table.

Upon the completion of the garbled replacement for the truth table of the corresponding operation gate in the gate circuit by the target computing node in the foregoing aspects, the garbled circuit may be generated. The target computing node may construct an exchange message based on an existing message exchange mechanism of the garbled circuit. The target computing node may use the salt values corresponding to the input values of the corresponding operation gate in the gate circuit and the salt values corresponding to the input values of the operation gate as a key, and uses the ciphertext data obtained by encrypting the salt values of the output values in the truth table of the operation gate as a computing parameter, to transmit the key and the computing parameter to the computing node serving as the execution party of the garbled circuit.

For example, in actual applications, when secure multi-party computation is implemented based on the garbled circuit algorithm, the garbled circuit algorithm and the oblivious transfer technology may be combined. When the target computing node transmits the computing parameter to the computing node serving as the execution party of the garbled circuit. On one hand, the target computing node may generally directly transmit the garbled truth table, in the form of a cleartext, to the computing node serving as the execution party of the garbled circuit. On the other hand, the oblivious transfer technology may be used, to transmit, in a blurring transmission manner, the salt values corresponding to the input values of the operation gate corresponding to the target computing node in the gate circuit to the computing node serving as the execution party of the garbled circuit.

A specific implementation process of transmitting data to the computing node serving as the execution party of the garbled circuit based on the oblivious transfer technology is not described in detail in this specification again. When a person skilled in the art implements the technical solution of this specification, reference may be made to the record in the related art.

After receiving the computing parameters transmitted by the computing nodes, the computing node serving as the execution party of the garbled circuit may perform decryption on the ciphertext data recorded in the garbled truth table of the operation gates corresponding to the computing nodes in the gate circuit according to the salt values corresponding to the input values of the operation gates corresponding to the computing nodes in the gate circuit, to obtain the salt values of the output values of the operation gates corresponding to the computing nodes in the gate circuit.

Eventually, the computing node serving as the execution party of the garbled circuit may perform an operation grade by grade based on the decrypted salt values of the output values of the operation gates in the gate circuit, to obtain a salt value corresponding to a final output value of the gate circuit, and then transmit the salt value as the final computation result to other computing nodes.

After receiving the salt value corresponding to the final output value of the gate circuit, the target computing node may query the truth table, to obtain an output value corresponding to the salt value based on a correspondence between a salt value and a true output value, and store the output value as an original value of a final computation result of the secure multi-party computation in the result storage system deployed locally.

For the computing nodes deployed in the distributed network, when the secure multi-party computation process shown above is completed, the computing nodes may perform visual output on the computation result stored in the result storage system to administrative users of the computing nodes.

In this specification, an exchange message carrying a large number of ciphertexts and/or random numbers may be transmitted between computing nodes carrying secure multi-party computation algorithms such as the secret sharing algorithm, the homomorphic encryption algorithm, and the garbled circuit algorithm. Even for a user of the secure multi-party computation algorithm, it is generally difficult to understand the specific meanings of the ciphertexts and/or random numbers carried in the exchange message.

Based on this, in this specification, when a target node device transmits, by constructing an exchange message based on the existing message exchange mechanism of the carried secure multi-party computation algorithm, the generated computing parameters to computing nodes participating in the secure multi-party computation, the target node device may further locally create an audit log related to the transmitted computing parameters, and store the created audit log in a log storage system deployed locally.

The audit log may be, for example, used for recording description information related to the computing parameters transmitted by the computing nodes participating in the secure multi-party computation.

In some embodiments, the computing parameter that the computing node needs to transmit to other computing nodes participating in the secure multi-party computation may be included in a message field in the exchange message constructed by the computing node. Therefore, the specific meaning of each field and description information related to each field in the exchange message constructed by the computing node may be recorded in the audit log for auditing.

Correspondingly, when the target node device receives the computing parameters transmitted by the other computing nodes through the constructed exchange message, the target node device may further locally create an audit log related to the computing parameters transmitted by the other computing nodes, and store the created audit log in the log storage system deployed locally.

For example, the computing nodes deployed in the distributed network may carry the same secure multi-party computation algorithm, so that the exchange message constructed by the computing nodes may conform to the same message format. Therefore, after receiving the exchange message transmitted by other computing nodes, the target computing node may parse the exchange message according to a standard message format to generate a corresponding audit log, and record the specific meaning of each field in the exchange message in the audit log.

In this specification, the description information that is recorded in the audit log and is related to the computing parameter may correspond to the content included by the computing parameters.

The computing parameter transmitted by the computing node to the other computing nodes through the exchange message may include a random number participating in the secure multi-party computation; and/or ciphertext data participating in the secure multi-party computation. Correspondingly, the description information that is recorded in the eventually generated audit log and is related to the computing parameter may include description information corresponding to the random number participating in the secure multi-party computation and/or description information corresponding to the ciphertext data participating in the secure multi-party computation.

Specific content of the description information is not specifically limited in this specification. In actual applications, the specific content of the description information may be determined based on an actual audit requirement of an administrative user of the computing node for a secure multi-party computation algorithm carried in the computing node.

In some embodiments, the description information that is recorded in the eventually generated audit log and is related to the computing parameter may include a random number generation rule corresponding to the random number participating in the secure multi-party computation and/or a key corresponding to the ciphertext data participating in the secure multi-party computation.

The random number generation rule may specifically cover any form of description information related to a generation mode of the random number.

For example, the random number may be generated in a computing node locally, obtained by performing an operation on a locally generated random number and other data by the computing node, received from other computing nodes or trusted random sources, obtained by performing an operation on random numbers received from other computing nodes or trusted random sources and other data, obtained by performing an operation on random numbers generated locally and received random numbers by the computing node. Examples are not exhaustively listed in this specification.

The key corresponding to the ciphertext data participating in the secure multi-party computation may include an encryption key used for encrypting the ciphertext data.

In some scenarios, in addition to the encryption key, the audit log may further include a decryption key used for decrypting the ciphertext data; and the audit log may even include cleartext data of the ciphertext data.

For example, in an implementation, the description information related to the computing parameter and recorded in the audit log created by the computing node and related to the computing parameter transmitted locally to other computing nodes may be different from the description information related to the computing parameters and recorded in the audit log that is created by the computing node and related to the received computing parameters transmitted by the other computing nodes.

Due to the secure multi-party computation nodes, input data used by each computing node may generally need to be kept confidential from other computing nodes participating in the secure multi-party computation. Therefore, the audit log created by the computing node and related to the computing parameter transmitted by the other computing nodes may only record the encryption key related to the ciphertext data if the computing node needs to record the key corresponding to the ciphertext data. The audit log created by the computing node and related to the computing parameter transmitted locally to the other computing nodes may further record the decryption key of the ciphertext data and the cleartext data of the ciphertext data in addition to the encryption key of the ciphertext data.

In this way, an administrative user of the computing node may further verify, after the ciphertext data generated locally as a computing parameter by the computing node is decrypted based on the decryption key recorded in the audit log, whether decrypted cleartext data of the computing parameter is consistent with the cleartext data of the computing parameter recorded in the audit log, and audit whether the secure multi-party computation algorithm carried in the computing node maliciously adds private data to the transmitted computing parameter without the user's consent, thereby improving the auditability of the algorithm.

In this specification, the computing nodes deployed in the distributed network may jointly use a secure multi-party algorithm provided by a provider of secure multi-party computation algorithms Although the secure multi-party algorithm is an algorithm designed to protect private data, an erroneous or malicious algorithm implementation may cause a breach of private data.

For example, a malicious secure multi-party computation algorithm may not use a random number generated as a key to encrypt the private data needed to be transmitted to other computing nodes, as designed in a legitimate algorithm. Instead, it may, without a user's consent, use a known key of other parties to encrypt private data to be transmitted to other computing nodes, and thus allow a receiver to obtain the private data held by the other computing nodes by using the known key to decrypt the data.

In another example, a malicious secure multi-party computation algorithm may, without a user's consent, construct a pseudo-random number based on private data held by the computing node, and transmit the private data to other computing nodes by using the pseudo-random number.

In this specification, the computing nodes deployed in the distributed network may perform a privacy audit on the secure multi-party algorithm carried in the computing nodes based on the audit log stored in the log storage system (or may only perform a privacy audit on the secure multi-party algorithm carried in this node or the secure multi-party algorithm carried in a specified computing node in the computing nodes) to determine whether the computing parameters transmitted by the computing nodes contain the risk of privacy leakage. In this specification, a "risk of privacy leakage" may refer to a risk of private data held by a computing node being inadvertently disclosed to unauthorized parties (i.e., a breach of the private data).

In actual applications, the privacy audit on the secure multi-party algorithm carried in the computing nodes may be alternatively performed by a third-party audit node. In this case, the computing nodes deployed in the distributed network may transmit the audit log in the log storage system to the audit node (e.g., the audit log may be transmitted actively or the audit node may actively retrieve the audit log), and the third-party audit node may perform, based on the received audit log, a privacy audit on the secure multi-party algorithm carried in the computing nodes to determine whether the computing parameters transmitted by the computing nodes contain a risk of privacy leakage.

For example, in a scenario, the computing nodes may carry a secure multi-party computation algorithm provided by the provider, and audit nodes may be independently deployed by operators of the computing nodes. The audit nodes may be used for performing a privacy audit on the secure multi-party computation algorithm provided by the provider.

The audit logic of performing a privacy audit on the secure multi-party algorithm carried in the computing nodes may depend on specific content of the description information related to the computing parameter and recorded in the audit log.

In some embodiments, for example, the computing parameter may be a random number participating in the secure multi-party computation, and the description information related to the computing parameter may be a random number generation rule corresponding to the random number participating in the secure multi-party computation.

In this scenario, the computing node may read an audit log corresponding to the random number transmitted as a computing parameter by the computing nodes participating in the secure multi-party computation from a log storage system deployed locally, and verify, based on a random number generation rule that is recorded in the received audit log and corresponds to the random number, whether the random number is constructed based on private data held by the other computing nodes.

For example, in actual applications, a digest value (e.g., a hash value) of data that is recorded in the random number generation rule and used to generate the random number may be computed, and the computed digest value may be compared with digest values of private data held by the other computing nodes to determine whether the random number is a pseudo-random number constructed based on the private data held by the other computing nodes.

If it is determined through verification that the random number is a random number constructed based on the private data held by the other computing nodes, the random number used as the computing parameter may contain the risk of privacy leakage. Otherwise, if it is determined through verification that a data source generating the random number is a valid data source, and the random number is not a random number constructed based on the private data held by the other computing nodes, the random number used as the computing parameter may not contain the risk of privacy leakage.

In this way, the computing node may determine whether the random number used as the computing parameter is a pseudo-random number constructed based on the private data held by the other computing nodes by performing a simple audit on the audit log in the log storage system deployed locally, so that the risk of privacy leakage can be identified in time.

In some embodiments, for an example in which the computing parameters are ciphertext data participating in the secure multi-party computation, the description information related to the computing parameters may be a key corresponding to the ciphertext data participating in the secure multi-party computation.

In this scenario, the computing node may read an audit log corresponding to the ciphertext data transmitted as a computing parameter by the computing nodes participating in the secure multi-party computation from a log storage system deployed locally, and verify, based on the key that is recorded in the received audit log and corresponds to the ciphertext data, whether the key is a known key held by the other computing nodes.

For example, in actual applications, the key that is recorded in the audit log and corresponds to the ciphertext data may be compared with known keys held by the other computing nodes to determine whether the key corresponding to the ciphertext data is a known key held by the other computing nodes.

If it is determined through verification that the key corresponding to the ciphertext data is a known key held by the other computing nodes, the random number used as the computing parameter may contain the risk of privacy leakage. Otherwise, if it is determined through verification that the key corresponding to the ciphertext data does not match the known keys held by the other computing nodes, the random number used as the computing parameter may not contain the risk of privacy leakage.

In this way, the computing node may determine whether the key corresponding to the ciphertext data used as a computing parameter is a known key held by the other computing nodes by performing a simple audit on the audit log in the log storage system deployed locally, so that the risk of privacy leakage can be identified in time.

In some scenarios, if the audit log further carries a decryption key used for decrypting the ciphertext data and cleartext data of the ciphertext data in addition to the encryption key, the computing node may further perform a security verification on the ciphertext data based on the decryption key corresponding to the ciphertext data and the cleartext data of the ciphertext data that are recorded in the received audit log, to determine whether private data is maliciously added to the ciphertext data by a carried secure multi-party computation algorithm.

For example, in some embodiments, after the ciphertext data generated locally as a computing parameter by the computing node is decrypted based on the decryption key recorded in the audit log, the computing node may further verify whether the decrypted cleartext data of the computing parameter is consistent with the cleartext data of the computing parameter recorded in the audit log (i.e., original cleartext data), and determine whether the secure multi-party computation algorithm carried in the computing node maliciously adds private data to the ciphertext data transmitted as a computing parameter without the user's consent.

If they are consistent, it may indicate that the implementation logic of the secure multi-party computation algorithm that is carried in the computing node and is provided by a provider is the same as the design of the secure multi-party computation algorithm, and the ciphertext data may not contain the risk of privacy leakage. If they are not consistent, it may indicate that the secure multi-party computation algorithm that is carried in the computing node and is provided by an algorithm provider may maliciously add private data to the transmitted computing parameter without the user's consent, and in this case, the ciphertext data may contain the risk of privacy leakage.

In this way, the computing node may determine, by performing a simple audit on the audit log in the log storage system deployed locally, whether private data is maliciously added to the ciphertext data serving as a computing parameter by a carried secure multi-party algorithm, so that the risk of privacy leakage can be identified in time.

According to the foregoing technical solution, the computing nodes participating in the secure multi-party computation may further create and store, after generating computing parameters based on a carried secure multi-party computation algorithm, an audit log corresponding to the computing parameters, and record description information related to the computing parameters in the audit log. Administrative users of the computing nodes may, by checking the audit log, access detailed information about the computing parameters generated based on the secure multi-party computation algorithm. Therefore, audit information facilitating the audit of the algorithm may be easily accessible to a user of the secure multi-party computation algorithm, and thus, for a provider of the secure multi-party computation algorithm, the foregoing secure multi-party computation algorithm may be accessible and auditable without disclosing the source code of the secure multi-party computation algorithm.

Figure 2:
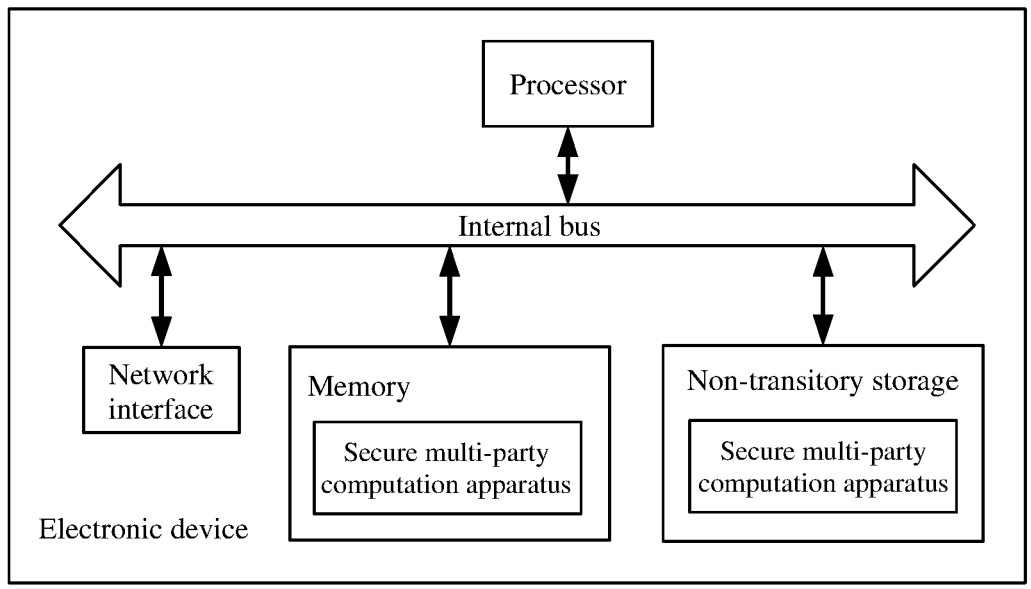
FIG. 2 is a schematic structural diagram of an electronic device according to an embodiment.

Corresponding to the foregoing method embodiments, this specification further provides an embodiment of a secure multi-party computation apparatus. The embodiment of the secure multi-party computation apparatus in this specification may be applicable to an electronic device. The apparatus embodiment may be implemented by software, or by hardware or a combination of software and hardware. Using a software implementation as an example, as a logical apparatus, the apparatus may be formed by reading corresponding computer program instructions from a non-transitory storage into a memory by a processor of an electronic device where the apparatus is located. On a hardware level, as shown in FIG. 2, which is a hardware structural diagram of an electronic device in which a secure multi-party computation apparatus according to this specification is located, the electronic device in which the apparatus is located in the embodiment not only includes a processor, a memory, a network interface, and a non-transitory storage shown in FIG. 2, but may also include other hardware according to actual functions of the electronic device. Details are not described herein again.

Figure 3:
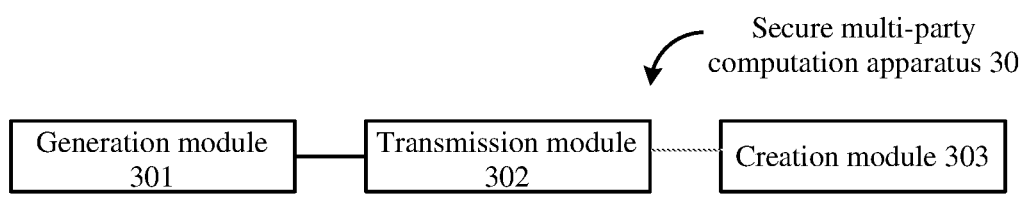
FIG. 3 is a block diagram of a secure multi-party computation apparatus according to an embodiment.

FIG. 3 is a block diagram of a secure multi-party computation apparatus according to an embodiment of this specification.

Referring to FIG. 3, the secure multi-party computation apparatus 30 may be applicable to the electronic device shown in FIG. 2, and may include a generation module 301, a transmission module 302, and a creation module 303.

The generation module 301 may be configured to generate a computing parameter related to private data held by one computing node based on a secure multi-party computation algorithm.

The transmission module 302 may be configured to transmit the computing parameter to other computing nodes participating in the secure multi-party computation for the other computing nodes to perform the secure multi-party computation based on collected computing parameters transmitted by the computing nodes participating in the secure multi-party computation.

The creation module 303 may be configured to create an audit log corresponding to the computing parameter. The audit log may record description information related to the computing parameter.

In some embodiments, the apparatus 30 may further include a collection module 304 (not shown in FIG. 3).

The collection module 304 may be configured to: collect computing parameters transmitted by the other computing nodes participating in the secure multi-party computation and perform the secure multi-party computation based on the collected computing parameters transmitted by the other computing nodes.

In some embodiments, the apparatus 30 may further include a creation module 303.

The creation module 303 may be further configured to: create an audit log corresponding to the computing parameters transmitted by the other computing nodes and store the audit log. The audit log may record description information related to the computing parameters.

In some embodiments, the computing parameter may include: a random number participating in the secure multi-party computation; and/or ciphertext data participating in the secure multi-party computation.

In some embodiments, the description information related to the computing parameter may include: a random number generation rule corresponding to the random number participating in the secure multi-party computation; and/or a key corresponding to the ciphertext data participating in the secure multi-party computation.

In some embodiments, the apparatus 30 may further include an audit module 305 (not shown in FIG. 3).

The audit module 305 may be configured to: perform, based on the audit log, a privacy audit on the computing parameter transmitted by the computing node participating in the secure multi-party computation, to determine whether the computing parameter transmitted by the computing node contains a risk of privacy leakage; or transmit the audit log to a third-party audit node for the audit node to perform a privacy audit on the computing parameter transmitted by the computing node participating in the secure multi-party computation, to determine whether the computing parameter transmitted by the computing node contains a risk of privacy leakage.

In some embodiments, the audit module 305 may be further configured to: determine, based on the random number generation rule that is recorded in the audit log and corresponds to the random number transmitted by the computing node participating in the secure multi-party computation, whether the random number is a random number constructed based on the private data held by the other computing nodes.

If the random number is a random number constructed based on the private data held by the other computing nodes, the audit module 305 may determine that the computing parameter transmitted by the computing node contains the risk of privacy leakage.

If the random number is not a random number constructed based on the private data held by the other computing nodes, the audit module 305 may determine that the computing parameter transmitted by the computing node does not contain the risk of privacy leakage.

In some embodiments, the audit module 305 may be further configured to: determine, based on the key that is recorded in the audit log and corresponds to the ciphertext data transmitted by the computing node participating in the secure multi-party computation, whether the key is a known key held by the other computing nodes.

If the key is a known key held by the other computing nodes, the audit module 305 may determine that the computing parameter transmitted by the computing node contains the risk of privacy leakage.

If the key is not a known key held by the other computing nodes, the audit module 305 may determine that the computing parameter transmitted by the computing node does not contain the risk of privacy leakage.

The implementation processes of the corresponding steps in the foregoing method embodiments may be referred to for details about the implementation processes of the functions and effects of the modules in the foregoing apparatus, which are not described herein again.

The apparatus embodiments generally correspond to the method embodiments, and therefore partial of full descriptions in the method embodiments may be referred to for related parts. The described apparatus embodiments are merely examples. The modules described as separate parts may or may not be physically separate, and parts displayed as modules may or may not be physical modules, may be located in one position, or may be distributed on a plurality of network modules. A part or all of the modules may be selected according to actual requirements to achieve the objectives of the solutions of this specification. A person of ordinary skill in the art may understand and implement the solutions without creative efforts.

The system, apparatus, module, or unit described in the foregoing embodiment may be, for example, implemented by a computer chip or entity, or a product with a specified function. A typical implementation device is a computer, and a specific form of the computer may be a personal computer, a laptop computer, a cellular phone, a camera phone, a smartphone, a personal digital assistant, a media player, a navigation device, an email device, a game console, a tablet computer, a wearable device, or a combination of any of these devices.

Corresponding to the foregoing method embodiment, this specification further provides an embodiment of an electronic device. The electronic device includes a processor and a memory configured to store machine-executable instructions. The processor and the memory may be generally connected by an internal bus. In other possible implementations, the device may further include an external interface for communication with other devices or components.

In this embodiment, by reading and executing the machine-executable instructions that are stored in the memory and correspond to control logic of secure multi-party computation, the processor may be caused to: generate a computing parameter related to private data held by a computing node based on a secure multi-party computation algorithm; transmit the computing parameter to other computing nodes participating in the secure multi-party computation for the other computing nodes to perform the secure multi-party computation based on collected computing parameters transmitted by the computing nodes participating in the secure multi-party computation; and create an audit log corresponding to the computing parameter. The audit log may record description information related to the computing parameter.

In some embodiments, by reading and executing the machine-executable instructions that are stored in the memory and correspond to control logic of secure multi-party computation, the processor may be caused to: collect computing parameters transmitted by the other computing nodes participating in the secure multi-party computation, and perform the secure multi-party computation based on the collected computing parameters transmitted by the other computing nodes; and create an audit log corresponding to the computing parameters transmitted by the other computing nodes, and store the audit log. The audit log may record description information related to the computing parameters.

In some embodiments, by reading and executing the machine-executable instructions that are stored in the memory and correspond to control logic of secure multi-party computation, the processor may be caused to: perform, based on the audit log, a privacy audit on the computing parameter transmitted by the computing node participating in the secure multi-party computation, to determine whether the computing parameter transmitted by the computing node contains a risk of privacy leakage; or transmit the audit log to a third-party audit node for the audit node to perform a privacy audit on the computing parameter transmitted by the computing node participating in the secure multi-party computation, to determine whether the computing parameter transmitted by the computing node contains a risk of privacy leakage.

In some embodiments, by reading and executing the machine-executable instructions that are stored in the memory and correspond to control logic of secure multi-party computation, the processor may be caused to: determine, based on the random number generation rule that is recorded in the audit log and corresponds to the random number transmitted by the computing node participating in the secure multi-party computation, whether the random number is a random number constructed based on the private data held by the other computing nodes.

If the random number is a random number constructed based on the private data held by the other computing nodes, the processor may be caused to determine that the computing parameter transmitted by the computing node contains the risk of privacy leakage.

If the random number is not a random number constructed based on the private data held by the other computing nodes, the processor may be caused to determine that the computing parameter transmitted by the computing node does not contain the risk of privacy leakage.

In some embodiments, by reading and executing the machine-executable instructions that are stored in the memory and correspond to control logic of secure multi-party computation, the processor may be caused to: determine, based on the key that is recorded in the audit log and corresponds to the ciphertext data transmitted by the computing node participating in the secure multi-party computation, whether the key is a known key held by the other computing nodes.

If the key is a known key held by the other computing nodes, the processor may be caused to determine that the computing parameter transmitted by the computing node contains the risk of privacy leakage.

If the key is not a known key held by the other computing nodes, the processor may be caused to determine that the computing parameter transmitted by the computing node does not contain the risk of privacy leakage.

Based on the aforementioned method embodiments, this specification further provides a secure multi-party computation apparatus. The apparatus may include a processor and a non-transitory computer-readable memory coupled to the processor. The computer-readable memory may be configured with instructions executable by the processor to perform operations.

The operations may include: generating, by one computing node of a plurality of computing nodes and based on a secure multi-party computation algorithm, a computing parameter related to data held by the one computing node. The plurality of computing nodes may be deployed in a distributed network and jointly participating in a secure multi-party computation based on data held on each of the plurality of computing nodes.

The operations may further include transmitting, by the one computing node, the computing parameter to other computing nodes of the plurality of computing nodes participating in the secure multi-party computation for the other computing nodes to perform the secure multi-party computation based on computing parameters transmitted by the computing nodes participating in the secure multi-party computation; and creating, by the one computing node, an audit log corresponding to the computing parameter generated by the one computing node, the audit log recording description information related to the computing parameter.

In some embodiments, the operations may include any one of the aforementioned secure multi-party computation methods. Relevant parts of the foregoing method embodiments may be referred to for details of the secure multi-party computation methods, which are not repeatedly described herein.

Based on the aforementioned method embodiments, this specification further provides a non-transitory computer-readable storage medium having instructions stored thereon executable by a processor to cause the processor to perform operations.

The operations may include generating, by one computing node of a plurality of computing nodes and based on a secure multi-party computation algorithm, a computing parameter related to data held by the one computing node. The plurality of computing nodes may be deployed in a distributed network and jointly participating in a secure multi-party computation based on data held on each of the plurality of computing nodes.

The operations may further include transmitting, by the one computing node, the computing parameter to other computing nodes of the plurality of computing nodes participating in the secure multi-party computation for the other computing nodes to perform the secure multi-party computation based on computing parameters transmitted by the computing nodes participating in the secure multi-party computation; and creating, by the one computing node, an audit log corresponding to the computing parameter generated by the one computing node, the audit log recording description information related to the computing parameter.

In some embodiments, the operations may include any one of the aforementioned secure multi-party computation methods. Relevant parts of the foregoing method embodiments may be referred to for details of the secure multi-party computation methods, which are not repeatedly described herein.

Other embodiments of this specification will be apparent to a person skilled in the art from consideration of the specification and practice of the present application disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of this specification only be limited by the appended claims.

The foregoing descriptions are merely exemplary embodiments of the present disclosure but are not intended to limit the present disclosure. Any modification, equivalent replacement, or improvement made without departing from the spirit and principle of the present disclosure should fall within the protection scope of the present disclosure.

What is claimed is:

1. A secure multi-party computation method, comprising:
generating, by a first computing node and based on a secure multi-party computation algorithm, first computing parameters, the first computing node and a second computing node deployed in a distributed network and jointly participating in a secure multi-party computation based on data respectively held on each of the first computing node and the second computing node, wherein the first computing parameters are related to the data held by the first computing node and comprise first ciphertext data for the secure multi-party computation;
obtaining, by the first computing node, second computing parameters from the second computing node, the second computing parameters related to the data held by the second computing node and comprising second ciphertext data for the secure multi-party computation;
performing, by the first computing node, the secure multi-party computation based on the second computing parameters;
generating, by the first computing node, an audit log recording description information related to the first computing parameters, the description information comprising an encryption key corresponding to the first ciphertext data, a decryption key for decrypting the first ciphertext data, and original first cleartext data corresponding to the first ciphertext data;
decrypting, by the first computing node, the first ciphertext data to obtain decrypted first cleartext data;
determining, by the first computing node:
(1) whether the encryption key recorded in the audit log is a known key known by the second computing node; and
(2) whether the decrypted first cleartext data is consistent with the original first cleartext data; and
determining, by the first computing node in response to determining that the encryption key is the known key known by the second computing node or the decrypted first cleartext data is not consistent with the original first cleartext data, that the first computing parameters contain a risk of privacy leakage; or
determining, by the first computing node in response to determining that the encryption key is not the known key known by the second computing node and the decrypted first cleartext data is consistent with the original first cleartext data, that the first computing parameters do not contain the risk of privacy leakage.

2. The method of claim 1, wherein the distributed network is a blockchain network, and the first computing node and the second computing node are node devices in the blockchain network.

3. The method of claim 2, further comprising:
transmitting, by the first computing node, the first computing parameters to the second computing node for the second computing node to perform the secure multi-party computation based on the first computing parameters.

4. The method of claim 2, wherein an operation logic corresponding to the secure multi-party computation is represented as a gate circuit, the first computing node corresponds to one or more operation gates in the gate circuit, and the data held by the first computing node is used as input data of the one or more operation gates.

5. The method of claim 4, wherein the operation logic is represented by a truth table comprising a plurality of input values and corresponding output values, and wherein the first ciphertext data is obtained by:
generating random numbers to replace the input values and output values in the truth table; and
using the random numbers replacing the input values as an encryption key to encrypt the random numbers replacing the output values to obtain the first ciphertext data.

6. The method of claim 1, wherein the secure multi-party computation algorithm is Homomorphic Encryption algorithm.

7. The method of claim 6, wherein performing the secure multi-party computation based on the second computing parameters comprises:
performing, by the first computing node and without decrypting the second ciphertext data, an operation on the first ciphertext data and the second ciphertext data to obtain generated ciphertext data.

8. The method of claim 7, further comprising:
transmitting, by the first computing node, the generated ciphertext data to the second computing node.

9. A first computing node, comprising a processor and a non-transitory computer-readable memory coupled to the processor, and configured with instructions executable by the processor to cause the processor to perform operations comprising:
generating, based on a secure multi-party computation algorithm, first computing parameters, the first computing node and a second computing node deployed in a distributed network and jointly participating in a secure multi-party computation based on data respectively held on each of the first computing node and the second computing node, wherein the first computing parameters are related to the data held by the first computing node and comprise first ciphertext data for the secure multi-party computation;
obtaining second computing parameters from the second computing node, the second computing parameters related to the data held by the second computing node and comprising second ciphertext data for the secure multi-party computation;
performing the secure multi-party computation based on the second computing parameters;
generating an audit log recording description information related to the first computing parameters, the description information comprising an encryption key corresponding to the first ciphertext data, a decryption key for decrypting the first ciphertext data, and original first cleartext data corresponding to the first ciphertext data;

decrypting the first ciphertext data to obtain decrypted first cleartext data;

determining:
- (1) whether the encryption key recorded in the audit log is a known key known by the second computing node; and
- (2) the decrypted first cleartext data is consistent with the original first cleartext data; and determining, in response to determining that the encryption key is the known key known by the second computing node or the decrypted first cleartext data is not consistent with the original first cleartext data, that the first computing parameters contain a risk of privacy leakage; or determining, in response to determining that the encryption key is not the known key known by the second computing node and the decrypted first cleartext data is consistent with the original first cleartext data, that the first computing parameters do not contain the risk of privacy leakage.

10. The computing node of claim 9, wherein the distributed network is a blockchain network, and the first computing node and the second computing node are node devices in the blockchain network.

11. The computing node of claim 10, wherein the operations further comprise:

transmitting the first computing parameters to the second computing node for the second computing node to perform the secure multi-party computation based on the first computing parameters.

12. The computing node of claim 10, wherein an operation logic corresponding to the secure multi-party computation is represented as a gate circuit, the first computing node corresponds to one or more operation gates in the gate circuit, and the data held by the first computing node is used as input data of the one or more operation gates.

13. The computing node of claim 12, wherein the operation logic is represented by a truth table comprising a plurality of input values and corresponding output values, and wherein the first ciphertext data is obtained by:

generating random numbers to replace the input values and output values in the truth table; and using the random numbers replacing the input values as an encryption key to encrypt the random numbers replacing the output values to obtain the first ciphertext data.

14. The computing node of claim 9, wherein the secure multi-party computation algorithm is Homomorphic Encryption algorithm.

15. The computing node of claim 14, wherein performing the secure multi-party computation based on the second computing parameters comprises:

performing, without decrypting the second ciphertext data, an operation on the first ciphertext data and the second ciphertext data to obtain generated ciphertext data.

16. The computing node of claim 15, wherein the operations further comprise:

transmitting the generated ciphertext data to the second computing node.

17. A non-transitory computer-readable storage medium storing instructions executable by a processor, wherein the processor and the non-transitory computer-readable storage medium are installed in a first computing node, the first computing node and a second computing node are deployed in a distributed network and jointly participating in a secure multi-party computation based on data respectively held on each of the first computing node and the second computing node, and, upon being executed by the processor, the instructions cause the processor to perform operations comprising:

generating, based on a secure multi-party computation algorithm, first computing parameters, wherein the first computing parameters are related to the data held by the first computing node and comprise first ciphertext data for the secure multi-party computation;

obtaining second computing parameters from the second computing node, the second computing parameters related to the data held by the second computing node and comprising second ciphertext data for the secure multi-party computation;

performing the secure multi-party computation based on the second computing parameters;

generating an audit log recording description information related to the first computing parameters, the description information comprising an encryption key corresponding to the first ciphertext data, a decryption key for decrypting the first ciphertext data, and original first cleartext data corresponding to the first ciphertext data;

decrypting, by the first computing node, the first ciphertext data to obtain decrypted first cleartext data;

determining:
- (1) whether the encryption key recorded in the audit log is a known key known by the second computing node; and
- (2) whether the decrypted first cleartext data is consistent with the original first cleartext data; and determining, in response to determining that the encryption key is the known key known by the second computing node or the decrypted first cleartext data is not consistent with the original first cleartext data, that the first computing parameters contain a risk of privacy leakage; or determining, in response to determining that the encryption key is not the known key known by the second computing node and the decrypted first cleartext data is consistent with the original first cleartext data, that the first computing parameters do not contain the risk of privacy leakage.

18. The non-transitory computer-readable storage medium of claim 17, wherein the distributed network is a blockchain network, and the first computing node and the second computing node are node devices in the blockchain network.

19. The non-transitory computer-readable storage medium of claim 17, wherein the secure multi-party computation algorithm is Homomorphic Encryption algorithm.

20. The non-transitory computer-readable storage medium of claim 19, wherein performing the secure multi-party computation based on the second computing parameters comprises:

performing, without decrypting the second ciphertext data, an operation on the first ciphertext data and the second ciphertext data to obtain generated ciphertext data.

* * * * *